(12) United States Patent
Samuel et al.

(10) Patent No.: US 11,304,087 B2
(45) Date of Patent: Apr. 12, 2022

(54) TECHNIQUES TO FACILITATE POLICY ASSURANCE FOR HIGH-RESILIENCY NETWORK ENVIRONMENTS

(71) Applicant: Cisco Technology, Inc., San Jose, CA (US)

(72) Inventors: Louis Gwyn Samuel, Swindon (GB); Timothy Peter Stammers, Raleigh, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 66 days.

(21) Appl. No.: 16/989,282

(22) Filed: Aug. 10, 2020

(65) Prior Publication Data
US 2022/0046460 A1  Feb. 10, 2022

(51) Int. Cl.
*H04W 24/02* (2009.01)
*H04W 28/02* (2009.01)
*H04W 28/10* (2009.01)
*H04W 48/16* (2009.01)

(52) U.S. Cl.
CPC ....... *H04W 28/0268* (2013.01); *H04W 28/10* (2013.01); *H04W 48/16* (2013.01)

(58) Field of Classification Search
CPC . H04W 28/0268; H04W 28/10; H04W 48/16; H04W 24/02; H04W 72/12; H04L 47/10; H04B 1/7075
See application file for complete search history.

(56) References Cited

U.S. PATENT DOCUMENTS

| 7,573,862 B2 * | 8/2009 | Chambers ............... H04L 47/14 370/349 |
| 10,588,052 B1 | 3/2020 | Srivastava et al. |
| 2010/0195503 A1 * | 8/2010 | Raleigh ............. H04W 28/0268 370/235 |

(Continued)

OTHER PUBLICATIONS

3GPP, "3rd Generation Partnership Project; Technical Specification Group Services and System Aspects; Service Enabler Architecture Layer for Verticals (SEAL); Functional architecture and information flows; (Release 16)," 3GPP TS 23.434 V16.4.0, Jul. 2020, 120 pages.

(Continued)

*Primary Examiner* — Mewale A Ambaye
(74) *Attorney, Agent, or Firm* — Edell, Shapiro & Finnan, LLC

(57) ABSTRACT

Presented herein are techniques to facilitate policy assurance for high-resiliency network environments. In one example, a method is provided that may include calculating an intended resiliency for each of a plurality of access networks based on resiliency characteristics; determining zone policies for each of a plurality of connectivity zones of a geographical area and for each of a plurality of traffic service classes; determining a network access resiliency policy for each client of a plurality of clients within each of the plurality of connectivity zones; determining a client access resiliency policy for each access network of the plurality of access networks; and communicating each network access resiliency policy to each client of the plurality of clients and communicating each client access resiliency policy to each access network of the plurality of access networks.

20 Claims, 7 Drawing Sheets

(56) References Cited

U.S. PATENT DOCUMENTS

2011/0314145 A1* 12/2011 Raleigh .............. H04L 43/0882
709/224
2016/0344604 A1* 11/2016 Raleigh ................. G06F 9/54
2018/0262924 A1* 9/2018 Dao ................. H04W 72/1257
2019/0394279 A1   12/2019 Dao et al.
2020/0145876 A1* 5/2020 Dao ..................... H04W 80/10

OTHER PUBLICATIONS

3GPP, "3rd Generation Partnership Project; Technical Specification Group Services and System Aspects; System architecture for the 5G System (5GS); Stage 2 (Release 16)", 3GPP TS 23.501 V16.5.0, Jul. 2020, 441 pages.

* cited by examiner

TECHNIQUES TO FACILITATE POLICY ASSURANCE FOR HIGH-RESILIENCY NETWORK ENVIRONMENTS

TECHNICAL FIELD

The present disclosure relates to network equipment and services.

BACKGROUND

Networking architectures have grown increasingly complex in communications environments, particularly wireless networking environments. In some cases, an operator may desire to deploy a network capable of providing high-resiliency services. One challenge with providing a high-resiliency network is providing assurance for network policies associated with such services.

DESCRIPTION OF EXAMPLE EMBODIMENTS

Overview

Figure 1:
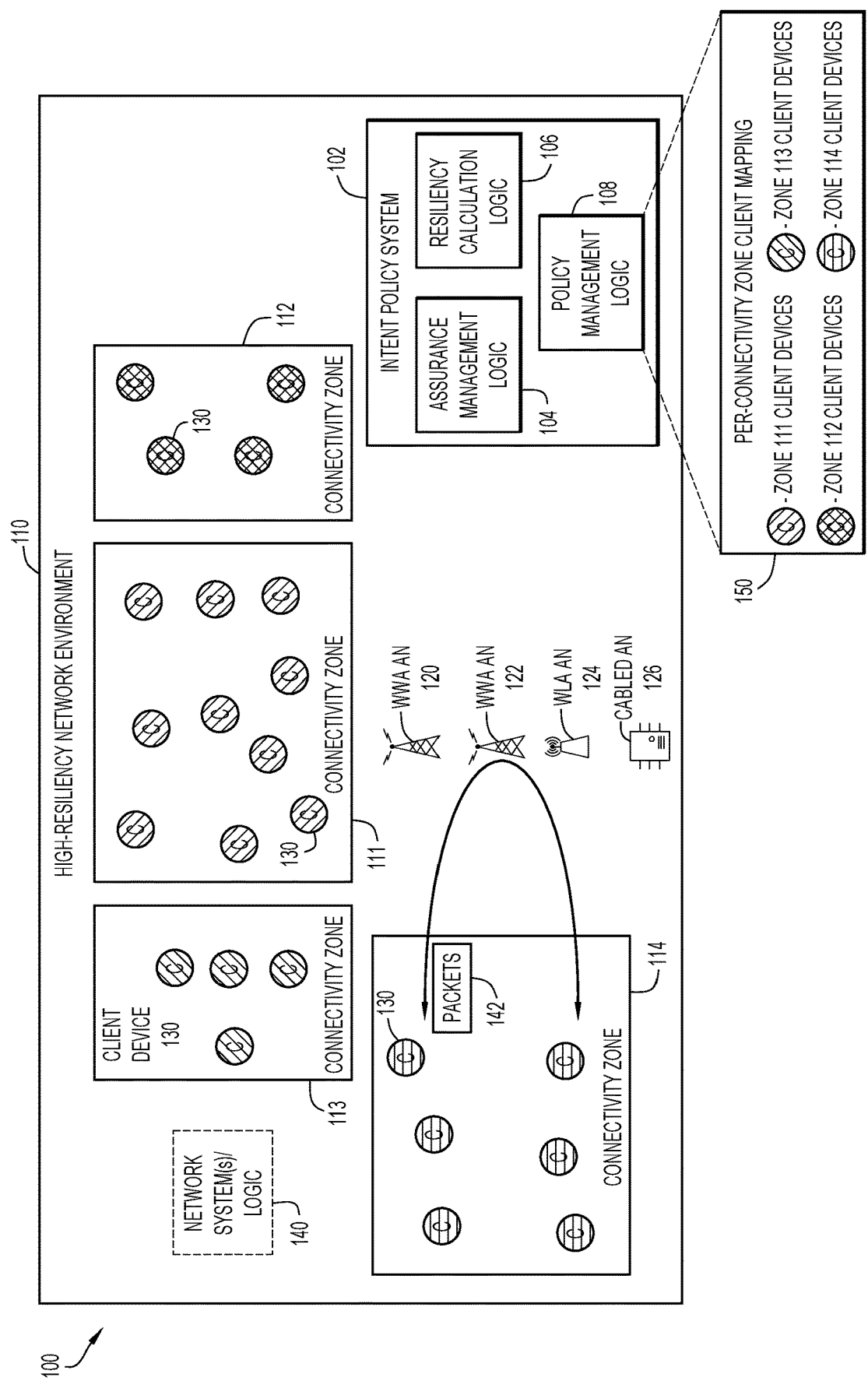
FIG. 1 is a diagram of a system in which techniques may be implemented to facilitate policy assurance for a high-resiliency network environment, according to an example embodiment.

Wireless technologies, which may be inclusive of Wireless Wide Area (WWA) access network (AN) technologies, such as Third (3rd) Generation Partnership Project (3GPP) Fifth Generation (5G), next Generation (nG), Narrowband (NB) Internet of Things (IoT), etc. ANs, Wireless Local Area (WLA) AN technologies, such as Institute of Electrical and Electronics Engineers (IEEE) 802.11 (e.g., Wi-Fi®), etc. ANs, and cabled networks, such as Ethernet networks, will be candidates for high-resiliency network deployments. For such deployments, there is a need for supporting policy and assurance functions that may be specifically tailored for high-resiliency network environments.

Provided herein are techniques that facilitate describing and/or defining network policies and defining sets of characteristics that can be measured to enable high-resiliency network deployments and assurance approaches. The net result is a set of techniques that may provide a system designer and operator of a high-resiliency networking environment with the ability to deploy wireless technologies alongside cabled approaches to satisfy various demands of high-resiliency networking.

In at least one example embodiment, a method is provided that may include calculating an intended resiliency for each of a plurality of access networks based on resiliency characteristics obtained from each of the plurality of access networks and determining, based, at least in part, on the intended resiliency for each of the plurality of access networks, zone policies for each of a plurality of connectivity zones of a geographical area and for each of a plurality of traffic service classes, wherein each connectivity zone of the plurality of connectivity zones provides access network connectivity for one or more access networks of the plurality of access networks. The method may further include determining, based on the zone policies, a network access resiliency policy for each client of a plurality of clients within each of the plurality of connectivity zones, wherein each network access resiliency policy for each client identifies one or more access networks to which each client is allowed to send packets for one or more traffic service classes of the plurality of traffic service classes and determining, based on the zone policies, a client access resiliency policy for each access network of the plurality of access networks, wherein each client access resiliency policy identifies, at least in part, which clients of the plurality of clients are permitted to communicate packets for one or more traffic service classes of the plurality of service classes for each access network of the plurality of access networks. The method may further include communicating each network access resiliency policy to each client of the plurality of clients and communicating each client access resiliency policy to each access network of the plurality of access networks.

Each zone policy may identify one or more of the plurality of access networks that can be utilized for transporting traffic flows within each connectivity zone for one or more traffic service classes of the plurality of traffic service classes in order to satisfy, at least in part, threshold resiliency metrics associated with the one or more traffic service classes.

In some instances, the method may further include calculating an actual resiliency for at least one access network of the plurality of access networks based, at least in part, on assurance measures obtained from the at least one access network and/or obtained from one or more clients. In such instances, the method may further include updating at least one zone policy for at least one traffic service class based on the actual resiliency calculated for the at least one access network to generate an updated zone policy for at least one traffic service class; updating, based on the updated zone policy, at least one of: at least one network access resiliency policy to generate an updated network access resiliency policy for at least one client; and at least one client access resiliency policy to generate an updated client access resiliency policy for at least one access network; and communicating at least one of: the updated network access resiliency policy to the at least one client; and the updated client access resiliency policy to the at least one access network.

Example Embodiments

Today's high-resiliency networks (e.g., which may be characterized as having 99.9999% availability, etc.) are typically built using proprietary protocols as well as approaches that adopt reliable multicast. Thus far, wireless networking, such as 3GPP 4th Generation (4G)/Long Term Evolution (LTE) or Wi-Fi, have not proven suitable for such high-resiliency network environments.

With the introduction of 5G Ultra-Reliable and Low-Latency Communication (URLLC) and/or Time Sensitive Network (TSN) services, high-resiliency networks such as those used in manufacturing, autonomous vehicle control, and/or similar environments are candidates to adopt these 5G services. Additionally, research into Wi-Fi networking in the areas of multipath packet delivery and associated scheduling technologies may result in Wi-Fi technologies also being appropriate for high-resiliency network deployment.

With the availability of multiple WWA and WLA technologies, it will be more complex for Information Technology (IT) and Operational Technology (OT) organizations to determine which technology and/or technology mix may be best suited for a given use case and to deploy such technology choices. Additionally, ongoing validation will be involved to determine that use case behavior has been, is, and will meet use case policy metrics and/or service criteria.

Provided herein are techniques that address policy aspects and validation aspects involved for applying/deploying one or more access network technologies in order to facilitate policy assurance for a high-resiliency network.

Referring to FIG. 1, FIG. 1 is a block diagram of a system 100 in which techniques may be implemented to facilitate policy assurance for a high-resiliency network environment, according to an example embodiment. System 100 may include a high-resiliency network environment 110 that may include an intent policy system 102 that may include assurance management logic 104, resiliency calculation logic 106, and policy management logic 108. A number of access networks may be deployed for the high-resiliency network environment 110, such as a first wireless wide area (WWA) access network (AN) 120, a second WWA AN 122, a Wireless Local Area (WLA) access network 124, and a wired or cabled AN 126, in which the access networks may facilitate network connectivity for one or more client devices 130 that may be included in a number of connectivity zones, such as a first connectivity zone 111, a second connectivity zone 112, a third connectivity zone 113, and a fourth connectivity zone 114.

In various embodiments, high-resiliency network environment 110 may represent a network area, which may be inclusive of any combination of: one or more floors of one or more facilities, one or more subdivisions of one or more floors of a facility, and/or the like. In general, a facility may include an office, building, factory, geographic area (e.g., a maintenance yard, etc.) multiple geographic areas, combinations and/or variations thereof, and/or the like. In some instances, high-resiliency network environment 110 may be utilized to facilitate various communications such as device-to-device (D2D) communications (e.g., between/among client devices 130), communications between client devices 130 and intent policy system 102, communications between client devices 130 and various network system(s)/logic 140 (e.g., connectivity zone controllers/logic, factory controllers/logic, sensor controllers/logic, manufacturing systems/logic, etc.), and/or communications between client devices 130 and one or more external data network(s) (not shown), such as the Internet, an Ethernet network or switching system, and/or the like. Although interconnections among various elements of system 100 are not illustrated for FIG. 1, it is to be understood that the various elements may be interconnected and/or interface using any connections (e.g., wired and/or wireless) to facilitate operations discussed herein.

Various communications discussed herein may be facilitated via the transmission, exchange, etc. of one or more packets. For example, packets 142 may be exchanged between client devices 130 via AN coverage provided for connectivity zone 114 (e.g., via WWA AN 122) to facilitate D2D communications between the client devices 130. Packet communications between/among various elements of high-resiliency network environment 110 may be referred to interchangeably herein as traffic, flows, traffic flows, variations thereof, and/or the like.

WWA AN 120, WWA AN 122, and WLA AN 124 may facilitate over-the-air Radio Frequency (RF) connections with one or more client devices 130 via WWA radio node(s) and WLA radio node(s) using any combination of licensed and/or unlicensed spectrum accesses, sometimes referred to as Radio Access Technology (RAT) types including, but not limited to: 3GPP licensed spectrum WWA accesses (e.g., 5G, New Radio (NR), and/or next Generation (nG) accesses); 3GPP unlicensed spectrum accesses (e.g., Licensed-Assisted Access (LAA), enhanced LAA (eLAA), further enhanced LAA (feLAA), and New Radio Unlicensed (NR-U)); Citizen Broadband Radio Service (CBRS) accesses; non-3GPP unlicensed spectrum WLA accesses such as IEEE 802.11 (e.g., Wi-Fi®); IEEE 802.16 (e.g., WiMAX®), Near Field Communications (NFC), Bluetooth®, and/or the like.

In various embodiments, WWA AN 120 and WWA AN 122 may be deployed using any number of WWA radio node(s), such as any combination of Citizen Broadband Radio Service (CBRS) radio devices (CBSDs), 5G and/or nG radio devices such as next generation Node Bs (gNBs or gNodeBs), and/or the like. The WWA ANs 120/122 may include any other network elements, as may be prescribed by 3GPP standards, such as one or more Unified Data Management (UDM) elements, Unified Data Repository (UDR) elements, Authentication, Authorization, and Accounting (AAA) elements, Access and Mobility Management Function (AMF) elements, Session Management Function (SMF) elements, User Plane Function (UPF) elements, and/or the like to facilitate WWA AN communications and/or operations as discussed herein.

In various embodiments, WLA AN 124 may be deployed using any number of WLA radio node(s) may be inclusive of Wi-Fi® access point(s) and/or the like. In some instances, WWA and WLA radio nodes may be implemented as combined WWA/WLA radio nodes to provide coverage for WWA and WLA ANs. Any number and/or combination of WLA and/or WWA radio node(s) may be deployed for the high availability network environment 110 in order to facilitate network connectivity in accordance with embodiments discussed herein. The WLA AN 124 may include any other network elements such as databases, repositories, Wireless LAN Controller (WLC) elements, AAA elements, and/or the like to facilitate WLA AN communications and/or operations.

In various embodiments, cabled AN 126 may facilitate wired connectivity (e.g., Ethernet, etc.) for one or more client devices 130 via one or more network elements including, routers, switches, gateways, and/or the like to facilitate communications and/or operations as discussed herein.

Although not illustrated in FIG. 1, it is to be understood that WWA radio node(s) for WWA ANs 120/122 may include any combination of hardware (e.g., communications units, receiver(s), transmitter(s), antenna(s) and/or antenna array(s), processor(s), memory element(s), baseband processor(s) (modems), etc.)], controllers, software, logic, and/or the like to facilitate over-the-air RF WWA access network connections with one or more client devices 130. Further, it is to be understood that WLA radio node(s) for WLA AN 124 may include any combination of hardware (e.g., communications units, receiver(s), transmitter(s), antenna(s) and/or antenna array(s), processor(s), memory element(s), baseband processor(s) (modems), etc.)], controllers, software, logic, and/or the like to facilitate over-the-air RF WLA access network connections with one or more client devices 130.

Client devices 130 may be associated with any combination of an electronic device, machine, sensor, robot, etc. wishing to initiate a flow in system 100. The terms 'client device', 'device', 'electronic device', 'automation device', 'computing device', 'machine', 'robot', and variations thereof are inclusive of devices used to initiate a communication, such as a computer, a vehicle and/or any other transportation related device having electronic devices configured thereon, an automation device, a sensor, a machine, a robot an enterprise device, an appliance, an IoT device, etc., a personal digital assistant (PDA), a laptop or electronic notebook, a telephone/smartphone/etc., an Internet Protocol (IP) phone, any other device and/or combination of devices, component, element, and/or object capable of initiating voice, audio, video, media, or data exchanges within system 100. Client devices 130 discussed herein may also be inclusive of a suitable interface to a human user such as a microphone, a display, a keyboard, or other terminal equipment. Client devices 130 discussed herein may also be any device that seeks to initiate a communication on behalf of another entity or element such as a program, a database, or any other component, device, element, or object capable of initiating an exchange within system 100. It is to be understood that any number of devices may be present in system 100.

It is to be understood that client devices 130 may also include any combination of hardware (e.g., communications units, receiver(s), transmitter(s), antenna(s) and/or antenna array(s), processor(s), memory element(s), baseband processor(s) (modems), etc.)], controllers, software, logic, and/or the like to facilitate any combination of WWA, WLA, and or cabled access network connections.

Intent policy system 102, via assurance management logic 104, resiliency calculation logic 106, and policy management logic 108 may facilitate policy assurance for the high-resiliency network environment 110 utilizing various techniques as discussed herein, below.

In at least one instance for the high-resiliency network environment 110, resiliency may be measured in terms of the ability of an access network to deliver packets (e.g., packets 142) with a certain availability with specific scheduling at a given time with a constrained level of jitter.

Resiliency can be achieved by a number of techniques including, but not limited to:

Multi-path transmission of the same information (e.g., transmitting duplicate packets of the same information across multiple accesses/paths);

High availability design incorporating connectivity across multiple paths of the same connectivity type;

Multi-path using disparate connectivity types; and/or

Configurations of various connectivity types that support various resiliency goals;

In accordance with embodiments herein, resiliency goals or characteristics may be defined for the high-resiliency network environment 110 via policy management logic 108 for different traffic service classes that may be intended to be supported within the environment. Various access network connectivity types (e.g., WWA AN 120, WWA AN 122, WLA AN 124, and/or cabled AN 126) may be configured for one or more connectivity zones (e.g., connectivity zones 111-114) to meet the resiliency goals for the environment in order to facilitate communications for the various traffic service classes. Once the resiliency goals are defined and the access network connectivity types are deployed, initial and ongoing compliance to the resiliency goals can monitored. In various embodiments, monitoring can include utilizing probes to monitor the packet transmissions, end or client device reporting, additional end devices designed to actively participate in the resilient network, combinations thereof, and/or the like.

In various embodiments, traffic service classes may be inclusive of any classes of traffic that may be provided for one or more services such as, mission critical emergency call services, resilient services for programmable logic controllers (PLC), machine communications, monitoring services needed to support preventive maintenance strategies, combinations and variations thereof, and/or the like.

As referred to herein, a policy intent may be characterized as a weighted combination of factors that may reflect resiliency goals or threshold resiliency metrics for different service classes of traffic. As an example, consider for packets of a first class (Class 1) that a threshold resiliency metric for Class 1 may be represented as:

$$\text{Resiliency (Class 1)} = \text{Availability (\%)} * w1 + \text{Scheduling Granularity (mS)} * w2 + \text{Scheduling Class } (1, \ldots, z) * w3 + \text{Packet Jitter Range } (x \leftrightarrow y \text{ ns}) * w4$$

As shown in the above example, the resiliency for packets of Class 1 may be calculated as a sum of: Availability that may be defined as a percentage and multiplied by a first weight (w1); Scheduling Granularity that may be defined in milliseconds and multiplied by a second weight (w2); Scheduling Class that may be defined using a class value (e.g., 1 thru a 'z' number of traffic classes) and multiplied by a third weight (w3); and a Packet Jitter Range that may be defined in nanoseconds as a range between values 'x' and 'y' and multiplied by a fourth weight (w4).

During operation, resiliency calculation logic 106 may calculate a per-traffic service class resiliency based on one or more traffic service classes that may be defined (e.g., by a network operator, etc.) for the high-resiliency network environment 110. It is to be understood that the above example resiliency calculation provides only one example for calculating a threshold resiliency metric. In various embodiments, any number and/or type of factors as well as any number and/or combination of weights and/or the like may be utilized to calculate a threshold resiliency metric for one or more traffic service classes. More than one type of service may be mapped to a given traffic service class.

Additionally, the intent policy system 102, may build or calculate an intended resiliency measure for each installed connectivity type, by connectivity zone, for the high-resiliency network environment 110. In one example, the intended resiliency measure for each connectivity type 'n' deployed or installed may be expressed as 'RSY(Intended [n])'. Each connectivity zone 111-114 may include access network connectivity at an intended resiliency for one or more of the access network(s), WWA AN 120, WWA AN 122, WLA AN 124, and/or cabled AN 126, provided for the high-resiliency network environment 110.

In some instances, a connectivity zone may be considered a client group (e.g., which can be grouped by any of device type, device capabilities/functions, etc.) under an assumption that a group of client devices 130 can be mapped to a connectivity zone. Policy management logic 108 may maintain a per-connectivity zone client mapping 150 that identifies each client device 130 that is provided within each connectivity zone 111-114. For example, a connectivity zone could be configured for a set or type of client devices that perform certain function(s) and/or that are capable of performing certain task(s), etc. In various embodiments, the per-connectivity zone client mapping 150 may identify client devices 130 belonging to a connectivity zone using device identifiers such as IP addresses, International Mobile Subscriber Identity (IMSI), Media Access Control (MAC) address, enterprise identifier (ID), and/or any other unique identifier that may be utilized to identify such devices.

During a deployment phase of the high-resiliency network environment 110, each access network, WWA AN 120, WWA AN 122, WLA AN 124, and cabled AN 126 may publish or otherwise communicate intended resiliency characteristics (e.g., intended availability, intended scheduling granularity, intended packet jitter or jitter range, etc.) to resiliency calculation logic 106 for one or more traffic service classes that each given access network is intended to support and resiliency calculation logic 106 may calculate an intended resiliency measure for each access network for each connectivity zone 111-114. At a later time, if characteristics of an installation and/or access network(s) may change, the intended resiliency measure for the access network(s) for one or more connectivity zone(s) 111-114 may be updated.

In some embodiments, cost may be an additional weighted factor that may be considered for calculating an intended resiliency of an access network. For example, in some instances the cost of extending coverage for a connectivity zone to include cabled access may result in that connectivity zone being a lower priority candidate for a deployment of a given service. Other use cases can be envisioned.

Consider an example in which: WWA AN 120 may be deployed with configuration having resiliency characteristics that are intended to support the first traffic service class (Class 1); WWA AN 122 may be deployed with a configuration having resiliency characteristics that are intended to support a second traffic service class (Class 2); WLA AN 124 may be deployed with a configuration having resiliency characteristics that are intended to support a third traffic service class (Class 3) and a fourth traffic service class (Class 4); and the cabled AN 126 may be deployed with a configuration having resiliency characteristics that are intended to support all of the first, second, third, and fourth traffic service classes.

Consider for the present example that traffic service classes may be represented or mapped to different colors or levels of service(s) in which Class 1 may be represented by a dark green color, Class 2 may be represented by a light green color, Class 3 may be represented by a red color, and Class 4 may be represented by an orange color. Other mappings, relationships, and/or representations can be envisioned.

In this example, each access network may publish its intended resiliency characteristics to resiliency calculation logic 106. As noted above, each connectivity zone 111-114 may include access network connectivity at an intended resiliency for one or more of the access network(s), WWA AN 120, WWA AN 122, WLA AN 124, and/or cabled AN 126. Resiliency calculation logic 106 may collect resiliency characteristics for each access network and calculate an intended resiliency measure for each access network within each connectivity zone deployed for the high-resiliency network environment 110. For example, the intended resiliency measure for an access network may be calculated using an algorithm similar to the calculation for threshold resiliency metrics in which a weighted sum of characteristics obtained from an access network may be calculated (e.g., for availability, scheduling granularity, jitter, etc.). In some instances, various coverage factors for access network(s) as related to coverage for each connectivity zone may be incorporated into intended resiliency measure calculations. For example, in some instances, characteristics such as walls, floor separation, radio node placement information, etc. may be included in intended resiliency measure calculations (e.g., using different variables, weights, etc.), which may impact the intended resiliency measure for each access network per connectivity zone. In some embodiments, an intended resiliency measure may be calculated such that the resiliency result is a combination of the resiliency value for each of two or more access networks. Thus, using any combination of per-access network and/or per-connectivity zone intended resiliency characteristics, resiliency calculation logic can calculate an intended resiliency measure for each access network technology for each connectivity zone 111-114.

Using the intended resiliency measure calculated for each access network technology for each connectivity zone and the per-traffic service class resiliency calculated for each traffic service class defined for the high-resiliency network environment 110, policy management logic 108 may instantiate or determine one or more zone policies for each connectivity zone 111-114. Zone policies for a connectivity zone may identify any combination of: whether the connectivity zone can be utilized to support or not support communications for each traffic service class and/or whether one or more access network technology types (e.g., any of WWA AN 120, WWA AN 122, WLA AN 124, and/or cabled AN 126) may be utilized for transporting flows for one or more traffic service classes.

A zone policy may be provided for each traffic service class within each connectivity zone, even if the policy for a given traffic service class indicates that the connectivity zone and/or one or more access network(s) are not to be utilized for transporting flows for the given traffic service class.

In an embodiment in which color mapping of traffic service classes may be utilized, as noted above, consider that the connectivity for each of the connectivity zones may also be represented by a corresponding color such that a traffic service class can be supported by a zone of a same color. For example, a dark green connectivity zone may be determined to support Class 1 and Class 2, whereas a light green connectivity zone may be utilized to provide transport for Class 2 service flows.

Additionally, access network connectivity per-color and per-zone could also be indicated in a manner such that connectivity with differing resiliency characteristics could be represented with differing intended resiliency characteristics by access network technology and per-connectivity zone. Therefore, each of the connectivity zone 'colors' could be used to map traffic service classes by connectivity.

For example, connectivity zone 111 may be configured with access network coverage for WWA AN 120, WLA AN 124, and cabled AN 126 having intended resiliency characteristics to support certain traffic service classes (e.g., Class 1, Class 2, etc.). Further, connectivity zone 112 may be configured with coverage for WLA AN 124 and cabled AN 126 having one or more higher levels of intended resiliency characteristics to support certain traffic service classes, whereas there may be limited WWA AN 122 coverage for connectivity zone 112 having lower intended resiliency characteristics that may support other (e.g., lower) traffic service classes. Further, connectivity zone 113 may be configured with coverage for WWA AN 120, WWA 122, and cabled AN 126 having one or more higher levels intended resiliency characteristics to support certain traffic service classes, whereas there may be limited WLA AN 124 coverage for connectivity zone 113 having intended resiliency characteristics that may support other traffic service classes. Further, connectivity zone 114 may be configured with coverage for WWA 122 having a higher level of intended resiliency to support certain traffic service classes, whereas there may be limited WWA AN 120 and limited WLA AN 124 coverage and no cabled AN 126 coverage (e.g., due to cost of deployment), which may or may not support other traffic services classes.

These examples are only a few of the many possibilities of connectivity zone access network technology coverage that may be provided for a network area in order to support transporting flows for one or more traffic service classes. Virtually any combinations may be provided for a high-resiliency network environment such that the intent policy system 102 may express the resiliency measure of a connectivity zone as well as the traffic service classes in a manner that considers access network technology resiliency (which may include cost, etc.) per-connectivity zone.

During operation, a network operator, user, etc. of the intent policy system 102 can request, by service that maps to packet or traffic service class, zone policy instantiation across different access network connectivity types that identify by traffic flow, which connectivity type may be used to transport those flows for each of one or more connectivity zones 111-114 using the intended resiliency calculated for each access network and for each zone.

Various zone policies can be envisioned including, such as, but not limited to:

Connectivity zones 112, 113, and 114 may not be used for the first traffic service class (Class 1).
Connectivity zone 111 may be used for the first and second traffic service classes (Class 1 and Class2).
Connectivity zone 111 cost of WLA AN 124 is ok for the second traffic service class (Class 2), whereas the cost of WWA AN 120 and WWA AN 122 is not.
Connectivity zone 111 cost of connectivity for the first traffic service class (Class 1) is irrelevant.
Connectivity zone 114 coverage requirements for RSY (intended) mandate that WLA AN 124 may not be used (e.g., due to limited coverage).

More generally, consider an example for a factory in which, for a permitted packet jitter range, knowing the configuration and coverage area of Wi-Fi6 in a given area of the factory and the same for 5G URLLC and/or TSN services, policy management logic 108 can determine which choices of connectivity are appropriate for the resiliency goals of Class 1 packets. For example, if the Wi-Fi6 network has multi-path delivery enhancements enabled then, for Class 1 packets, the availability goal could be met but the scheduling accuracy of the installed software release of the AP may not meet the goals.

Other zone policies can be envisioned. These example zone policies are only a few of the many zone policies that may be instantiated by the intent policy system 102 using per-traffic service class threshold resiliency metrics and intended resiliency characteristics for various configurations of access network technologies (e.g., any of WWA AN 120, WWA AN 122, WLA AN 124, cabled AN 126, etc.) that may be deployed for one or more connectivity zones 111-114 of the high-resiliency network environment 110.

Recall, that policy management logic 108 maintains a per-connectivity zone client mapping 150 that identifies each client device 130 configured for each connectivity zone 111-114. Using the zone policies for each connectivity zone 111-114 and the per-connectivity zone client mapping 150, policy management logic 108 may determine a network access resiliency policy for each client device 130 within each of the plurality of connectivity zones 111-114. Each network access resiliency policy for each client device 130 may identify one or more access networks to which each client is allowed to send packets (142) for one or more traffic service classes for one or more services (e.g., any combination of emergency services, measurement services, reporting services, sensor and/or monitoring services, resilient services for PLC operations, machine and/or D2D communication services, maintenance services, etc.), as requested by a network operator, etc. for the high-resiliency network environment 110.

For example, a network access resiliency policy for each client device 130 within connectivity zone 111 may identify (e.g., using the example zone policies noted above) that any of WWA AN 120, WLA AN 124, and/or cabled AN 126 can be utilized for sending traffic flows for Class 1 services, whereas WLA AN 124 is preferable for sending traffic flows for Class2 services rather than WWA AN 120 and WWA 122 (e.g., due to cost). In another example, using the example zone policies noted above, a network access resiliency policy for each client device 130 within connectivity zone 114 may identify that WLA 124 is not to be utilized for sending traffic flows for any of the traffic service classes (e.g., due to limited coverage). Other network access resiliency policies and/or combinations thereof can be envisioned. A network access resiliency policy can be sent to each client device 130 within each connectivity zone 111-114. Each client device, via policy enforcement logic (not shown in FIG. 1) configured therefore can be utilized to enforce or enable connections to one or more access networks for communicating packets for one or more traffic service classes.

In addition to determining a network access resiliency policy for each client device 130, policy management logic 108 may also determine a client access resiliency policy for each access network WWA AN 120, WWA AN 122, WLA AN 124, and cabled AN 126. Each client access resiliency policy may identify, at least in part, which client devices 130 are permitted to communicate (e.g., permit or deny) with which access network for one or more traffic service class(es). For example, in some instances, a client access resiliency policy may indicate that communications may be permitted one or more client device(s) 130 for one or more traffic service classes and/or may not be permitted for one or more traffic service classes (e.g., permitted for any client devices mapped for connectivity zone 111 for any access network for Class 1 communications, permitted for any client devices mapped for connectivity zone 111 for WLA AN 124 for Class2 communications but denied for WWA 120, etc.). In some embodiments, a client access resiliency policy may be determined for a group and/or a type of client devices 130 (e.g., for application to all client devices 130 of a connectivity zone). In some embodiments, a network access resiliency policy may further identify whether multipath transmissions are to be utilized for a given client device 130 for one or more traffic service class(es).

A client access resiliency policy identifying each client device 130 that may communicate with a given access network for one or more traffic service class(es) can be communicated to each access network WWA AN 120, WWA AN 122, WLA AN 124, and cabled AN 126. For example, client access resiliency policies may be communicated, depending on access network technology type, to UDM elements, UDR elements, AAA elements, WLC elements, AMF elements, SMF elements, radio nodes, Ethernet switches/routers, and/or any other controller, manager, database, etc. that may be utilized to enforce connections and/or facilitate transmissions and/or packet transport communications for one or more client device 130 according to client and/or client group access resiliency policies. In various embodiments, client devices may be identified using any combination of IMSI, MAC, enterprise ID, etc.

Additionally during operation of system 100, an actual resiliency measure, which may be expressed as 'RSY(actual [n])' for each connectivity type 'n' utilized for each connectivity zone 111-114, may be calculated. The actual resiliency measure for an access network may be calculated using an algorithm similar to the calculation for threshold resiliency metrics in which a weighted sum of feedback obtained from an access network may be calculated (e.g., for availability, scheduling granularity, jitter, etc.). For example, feedback may be received from deployment behavior measures provided by each access network and/or client device for each connectivity zone and an actual resiliency measure for each access network RSY(actual[n]) can be calculated/updated. Such updating can then result in zone policy changes that may involve any combination of human confirmation and/or a fully-automated re-evaluation in order to update the intent for one or more zone policy instantiation mapping(s), which may be expressed as 'RSY(Intended[n+y])'. In some embodiments, an actual resiliency measure may be calculated such that a resiliency result is a combination of the resiliency value for each of two or more access networks.

Figure 2:
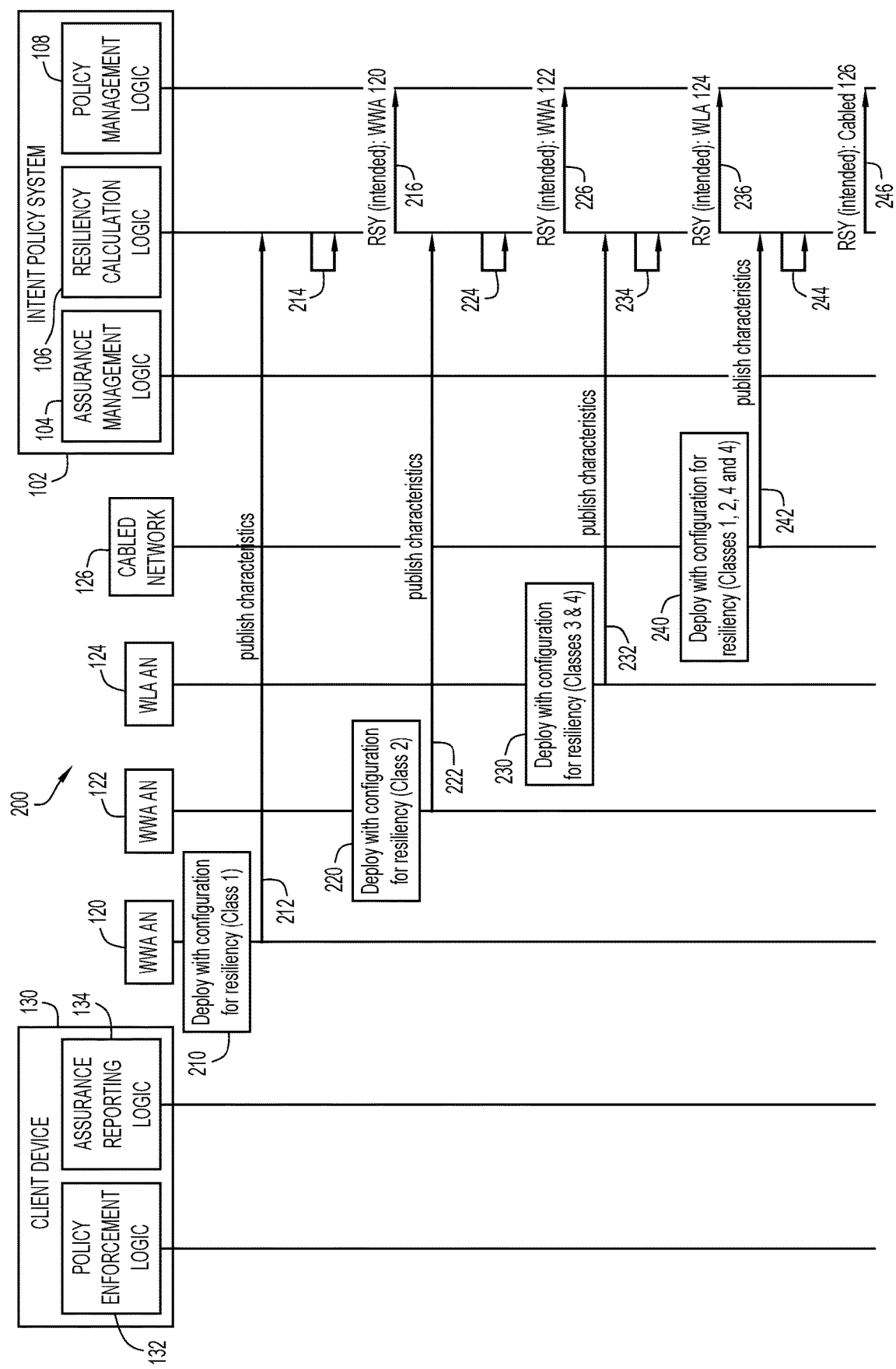
FIG. 2 is a message sequence diagram of a call flow illustrating example details associated with deployment phase operations that may be performed for the high-resiliency network environment of FIG. 1, according to an example embodiment.
Figure 3:
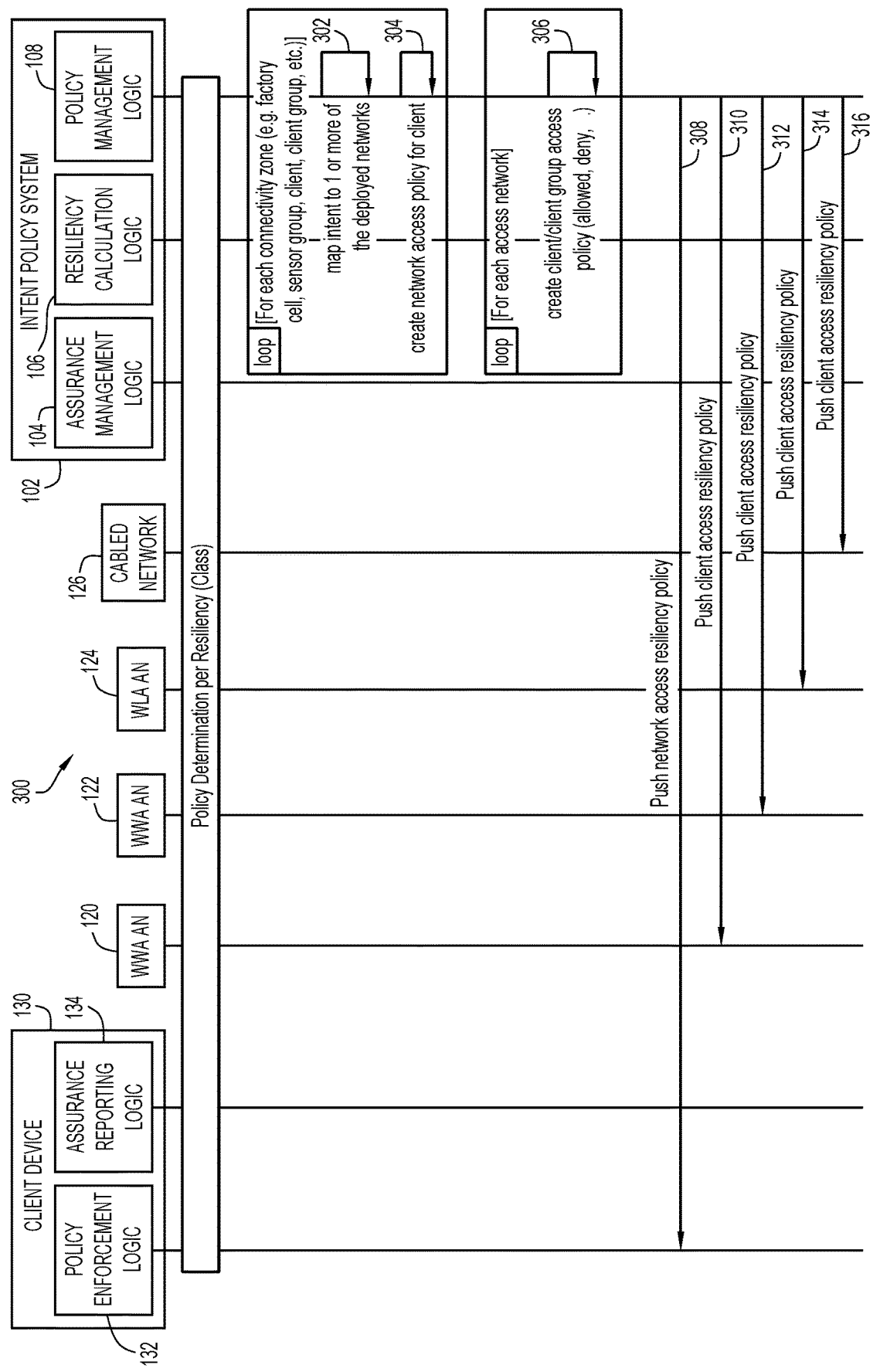
FIG. 3 is a message sequence diagram of a call flow illustrating example details associated with policy determination phase operations that may be performed for the high-resiliency network environment of FIG. 1, according to an example embodiment.

Consider various message sequence diagrams shown in FIGS. 2, 3, 4A, and 4B, which illustrate example details associated with operations involving determining network access resiliency policies for one or more client devices 130 as well as client access network selection/resiliency policies for each access network WWA AN 120, WWA AN 122, WLA AN 124, and cabled AN 126 based on resiliency. For FIGS. 2, 3, 4A, and 4B, the concept of a connectivity zone may be represented as client groups under an assumption that a group of client devices 130 can be mapped to a connectivity zone (e.g., via per-connectivity zone client mapping 150). FIGS. 2-4 illustrate various operations that may be performed for different phases of deploying and/or operating a high-resiliency network environment. For example, FIG. 2 is a message sequence diagram of a call flow 200 illustrating example details associated with deployment phase operations that may be performed for the high-resiliency network environment 110 of FIG. 1, according to an example embodiment.

FIG. 2 includes a given client device 130, which may include policy enforcement logic 132 and assurance reporting logic 134. Also shown in FIG. 2 are WWA AN 120, WWA AN 122, WLA AN 124, cabled AN 126, and intent policy system 102 including assurance management logic 104, resiliency calculation logic 106, and policy management logic 108. For the embodiments of FIGS. 2, 3, 4A, and 4B, consider that a threshold resiliency metric for each of a number of traffic service classes 1-4 are calculated via resiliency calculation logic 106 using various factors and weights, as discussed herein.

At 210, consider that WWA AN 120 is deployed with a configuration having intended resiliency characteristics capable of supporting the first traffic service class (Class 1). At 212, WWA AN 120 (e.g., via a controller, management node, etc.) publishes its intended resiliency characteristics to resiliency calculation logic 106, which calculates, at 214, an intended resiliency measure (RSY(intended)) for WWA AN 120 and communicates, at 216, the intended resiliency measure to policy management logic 108.

Similar operations may be performed for WWA AN 122, as shown at 220, 222, 224, and 226 in which WWA AN 122 is deployed with intended resiliency characteristics capable of supporting the second traffic service class (Class 2). Similar operations may also be performed for WLA AN 124, as shown at 230, 232, 234, and 236 in which WLA AN 124 is deployed with intended resiliency characteristics capable of supporting the third and fourth traffic service classes (Class 3 and Class 4). Similar operations may also be performed for cabled AN 126, as shown at 240, 242, and 246 in which cabled AN 126 is deployed with intended resiliency characteristics capable of supporting the first, second, third, and fourth traffic service classes (Classes 1, 2, 3, and 4).

Continuing to FIG. 3, FIG. 3 is a message sequence diagram of a call flow 300 illustrating example details associated with policy determination phase operations that may be performed for the high-resiliency network environment 110 of FIG. 1, according to an example embodiment. FIG. 3 includes a given client device 130, which may include policy enforcement logic 132 and assurance reporting logic 134. Also shown in FIG. 3 are WWA AN 120, WWA AN 122, WLA AN 124, cabled AN 126, and intent policy system 102 including assurance management logic 104, resiliency calculation logic 106, and policy management logic 108.

Policy determination phase operations as shown in FIG. 3 can be performed initially upon determining intended resiliency measures for each access network (e.g., following deployment phase operations as discussed for FIG. 2) and/or upon determining actual resiliency measures using assurance measures obtained from access network(s) and/or client devices (e.g., following assurance phase operations as discussed for FIGS. 4A and 4B, below).

For example, continuing from the operations as discussed above for FIG. 2, at 302, policy management logic 108 may, for each connectivity zone (e.g., client, client group, factory cell, sensor group, etc.), map policy intent (e.g., per-traffic service class threshold resiliency metrics) to zone policies for one or more of the deployed access networks for which intended resiliency measures were calculated (e.g., for WWA AN 120, WWA AN 122, WLA AN 124, cabled AN 126) such that the per-traffic service class threshold resiliency metric for each traffic service class are satisfied.

In one example, satisfying a traffic service class threshold resiliency metric may be achieved if the intended resiliency measure for an access network may facilitate traffic flow resiliency that meets or exceeds the threshold resiliency metric for the traffic service class. In another example, satisfying a threshold resiliency metric for a traffic service class may include meeting or exceeding the threshold resiliency metric for the traffic service class within a certain cost. Thus, many variations can be envisioned for zone policy mappings that can be generated by policy management logic 108.

Using the determined zone policies, policy management logic 108 may also create a network access policy for each client device 130 within each connectivity zone, as shown at 304. Further, for each access network (e.g., WWA AN 120, WWA AN 122, WLA AN 124, cabled AN 126), policy management logic 108 may also create a per-client and/or per-client group access resiliency policy for each access network, as shown at 306.

As shown at 308, intent policy system 102 via policy management logic 108 communicates the network access resiliency policy to policy enforcement logic 132 for client device(s) 130. Further, as shown at 310, 312, 314, and 316, intent policy system 102 via policy management logic 108 communicates each per-access network client access policy resiliency policy to each corresponding access network.

The network access resiliency policy for each client device and the client access resiliency policy for each access network can be utilized may be used to enforce transport decisions for different traffic service classes that may be utilized for client device 130 communications for each connectivity zone 111-114. Recall, that the present example continued from the intended resiliency measures calculated based on characteristics published by each access network WWA AN 120, WWA AN 122, WLA AN 124, and cabled AN 126 following initial deployment.

As noted previously, actual resiliency for each access network can be measured during operation in order to update zone policies for one or more connectivity zones, which may result in an updating of network access resiliency policies for one or more client device(s) and/or client/client group network access resiliency policies for one or more access networks. For example, FIGS. 4A and 4B are a message sequence diagram of a call flow 400 illustrating example details associated with assurance phase operations that may be performed for the high-resiliency network environment 110 of FIG. 1, according to an example embodiment.

In some instances, various coverage factors for access network(s) as related to coverage for each connectivity zone may be incorporated into intended resiliency measure calculations. For example, in some instances, characteristics such as walls, floor separation, radio node placement information, etc. may be included in intended resiliency measure calculations (e.g., using different variables, weights, etc.), which may impact the intended resiliency measure for each access network per connectivity zone. Thus, resiliency calculation logic 106 can calculate an intended resiliency measure for each access network technology for each connectivity zone 111-114 using assurance measures obtained from any combination of one or more access networks and/or one or more client devices.

Figure 4A:
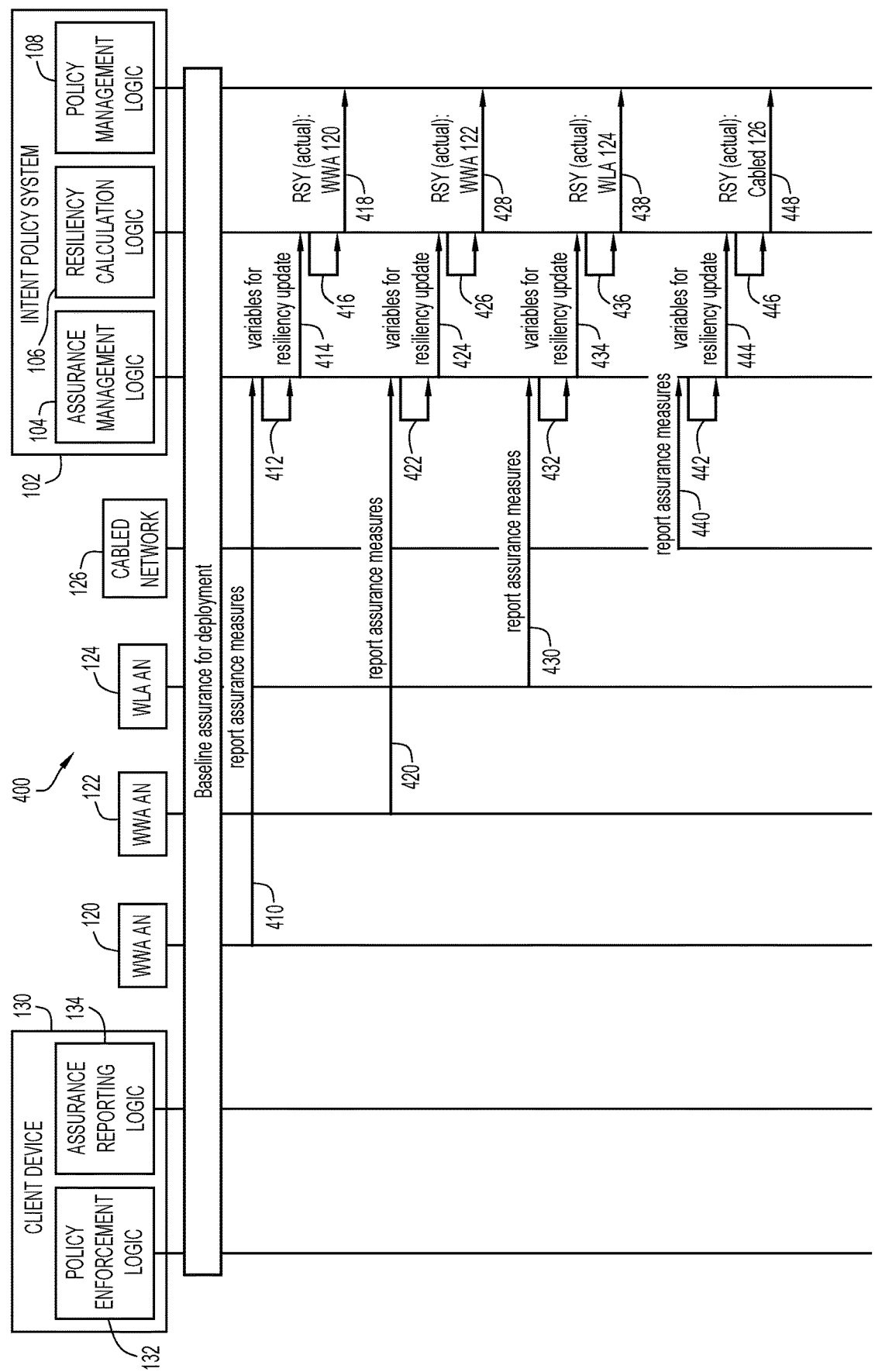
FIGS. 4A and 4B are a message sequence diagram of a call flow illustrating example details associated with baseline assurance phase operations that may be performed for the high-resiliency network environment of FIG. 1, according to an example embodiment.
Figure 4B:
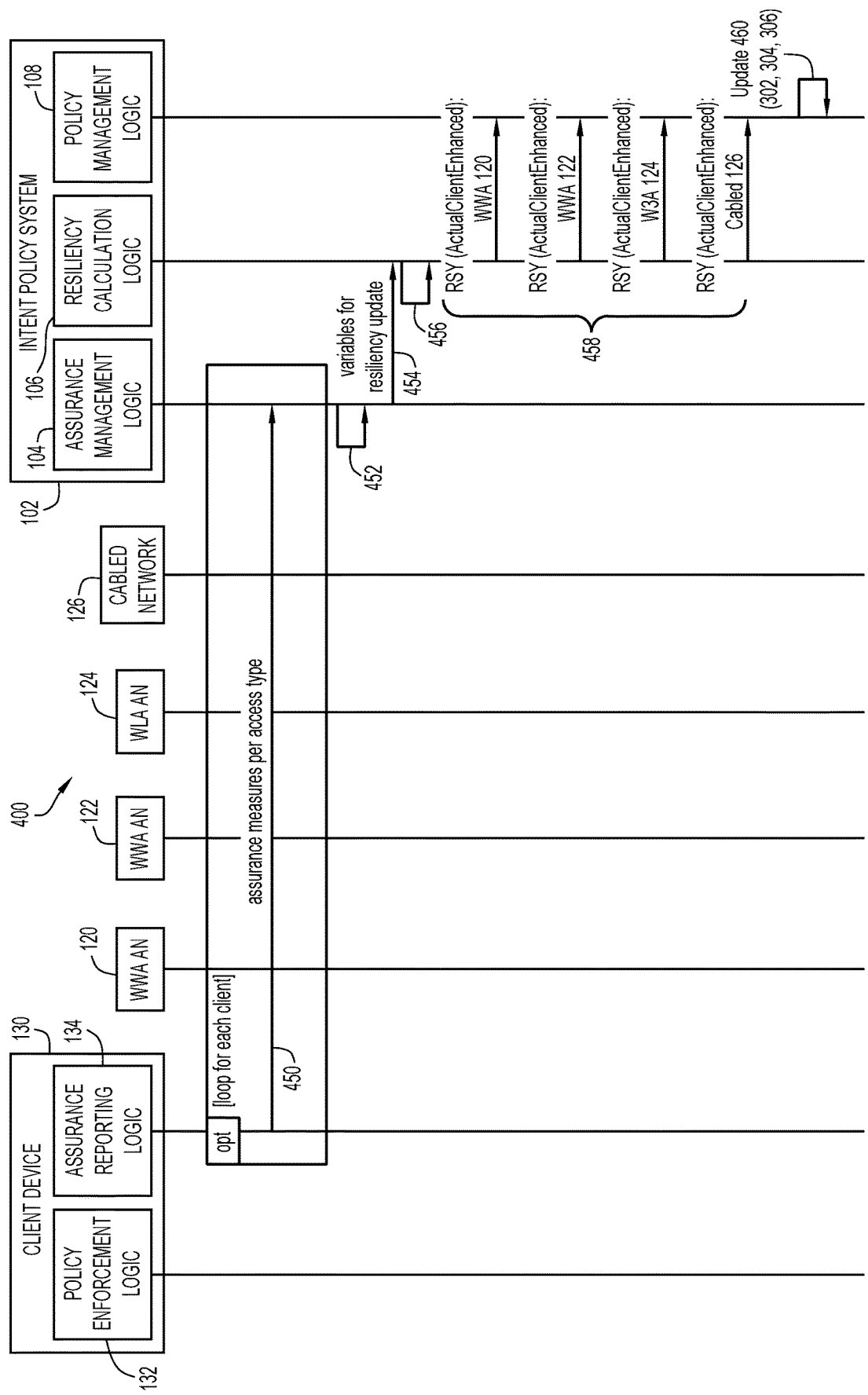

In various embodiments, assurance phase operations as shown in FIGS. 4A and 4B can be performed periodically by access networks/client devices, can be triggered based on one or more network conditions, can be performed when updates and/or configurations of one or more access networks are changed and/or deployed, can be performed when one or more services and/or one or more traffic service classes are configured, updated, added, or removed for the network environment, combinations thereof, and/or the like.

Recall, for the embodiments of FIGS. 2, 3, 4A, and 4B that WWA AN 120 may be deployed with intended resiliency characteristics capable of supporting the first traffic service class (Class 1), WWA AN 122 may be deployed with intended resiliency characteristics capable of supporting the second traffic service class (Class 2), WLA AN 124 may be deployed with intended resiliency characteristics capable of supporting the third and fourth traffic service classes (Class 3 and Class 4), and cabled AN 126 may be deployed with intended resiliency characteristics capable of supporting the first, second, third, and fourth traffic service classes (Classes 1, 2, 3, and 4).

At 410 for FIG. 4A, consider that WWA AN 120 reports assurance measurements for the WWA AN 120 to assurance management logic 104 for the intent policy system 102. Based on the reported assurance measures, assurance management logic 104 determines, at 412, one or more variables that are to be reported to resiliency calculation logic 106, as shown at 414. For example, in one instance, assurance management logic 104 may filter assurance measures to determine the variables that may be utilized by the resiliency calculation logic 106 to calculate an actual resiliency measure (RSY(actual)) for a given access network. In another instance, assurance management logic 104 may generate one or more variables using assurance measurements obtained from a given access network. For example, assurance management logic 104 may generate any of an availability percentage, a scheduling estimate, a packet jitter or jitter range estimate, and/or the like based on one or more measures obtained from a given access network.

At 416, resiliency calculation logic 106 calculates an actual resiliency measure for WWA AN 120 based on the variables obtained from assurance measurement logic and, at 418, resiliency calculation logic 106 communicates the actual resiliency measure to policy management logic.

Similar operations for WWA AN 122 may be performed as shown at 420, 422, 424, 426, and 428; for WLA AN 124 as shown at 430, 432, 434, 436, and 438; and for cabled AN 126 as shown at 440, 442, 444, 446, and 448. In some embodiments, actual resiliency measures may be calculated such that a resiliency result is a combination of the resiliency value for each of two or more access networks.

Assurance measures may also be reported by one or more client device(s) 130 per access type that the client device(s) 130 may utilize for communications. For example, as shown at 450 for FIG. 4B, client device 130 via assurance reporting logic 134 may communicate assurance measures, per-access type, to assurance management logic 104. As shown at 452, assurance management logic 104 determines variables that may be utilized for resiliency updates for each access network, which are communicated to resiliency calculation logic at 454. At 456, resiliency calculation logic 106 calculates client-enhanced actual resiliency measures for each access network (e.g., enhanced based on the client measures), which are communicated to policy management logic 108, for each access network, as shown at 458. Although separate communications are illustrated at 458, it is to be understood that a single communication including client-enhanced actual resiliency measures for each access network may be utilized. Further, it is to be understood that the client-enhanced actual resiliency measures may be calculated and reported for any combination of the one or more access network(s). Further, In some embodiments, client-enhanced resiliency measures may be calculated such that a resiliency result is a combination of the resiliency value for each of two or more access networks.

In various examples, assurance measures reported by one or more access network(s) and/or client(s) may include, but not be limited to: a number of clients connected to an access network over a time period (e.g., 5 minute intervals); a maximum throughput experienced over a time period, an average throughput experiences over a time period; if a node is a multi-access node, presence of traffic on each access type for the node; queue depths for transmissions from access network(s) to client(s); queue depths for transmissions from client(s) to access network(s); a number of clients denied access over a time period; client reported latencies for packet transfers; packet jitter; location-based measurement information; maintenance actions over a time period; combinations thereof; and/or the like.

As shown at 460, policy management logic can determine connectivity zone policy updates, network access resiliency policy updates for one or more client device(s) 130, and/or client/client group access resiliency policy updates for one or more access network(s), as discussed for FIG. 3 at 302, 304, and/or 306. Upon determining any updates, corresponding updated policies can be communicated to the client device(s) and/or the access network(s), as discussed for FIG. 3 at 308, 310, 312, 314, and/or 316.

Figure 5:
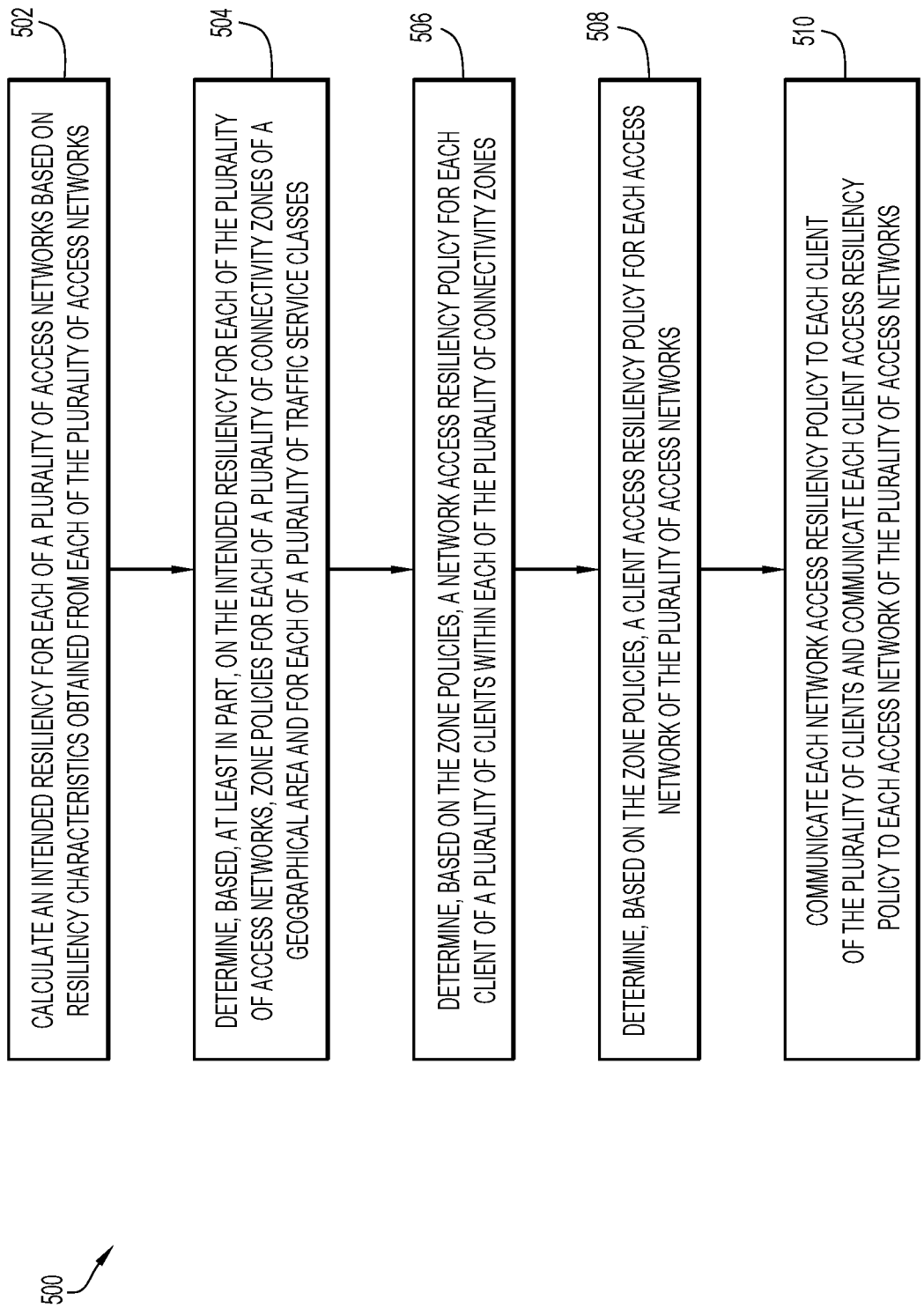
FIG. 5 is a flow chart depicting a method according to an example embodiment.

Referring to FIG. 5, FIG. 5 is a flow chart depicting a method 500 according to an example embodiment. In at least one embodiment, method 500 illustrates example operations that may be performed, at least in part, by an intent policy system, such as intent policy system 102 including assurance management logic 104, resiliency calculation logic 106, and policy management logic 108 in at least one embodiment.

At 502, the method may include the intent policy system calculating an intended resiliency for each of a plurality of access networks based on resiliency characteristics obtained from each of the plurality of access networks.

At 504, the method may include the intent policy system determining, based, at least in part, on the intended resiliency for each of the plurality of access networks, zone policies for each of a plurality of connectivity zones (e.g., connectivity zones 111-114, as shown in FIG. 1) of a geographical area (e.g., a facility, etc.) and for each of a plurality of traffic service classes. Each connectivity zone of the plurality of connectivity zones may include access network connectivity for one or more access networks of the plurality of access networks (e.g., full, partial, limited, etc. access network coverage for any combination of WWA AN 120, WWA AN 122, WLA AN 124, and/or cabled AN 126). Each zone policy may identify one or more of the plurality of access networks that can be utilized for transporting traffic flows within each connectivity zone for one or more traffic service classes of the plurality of traffic service classes in order to satisfy, at least in part, threshold resiliency metrics associated with the one or more traffic service classes.

At 506, the method may include the intent policy system determining, based on the zone policies, a network access resiliency policy for each client of a plurality of clients within each of the plurality of connectivity zones. Each network access resiliency policy for each client may identify one or more access networks to which each client is allowed to send packets for one or more traffic service classes of the plurality of traffic service classes.

At 508, the method may include the intent policy system determining, based on the zone policies, a client access resiliency policy for each access network of the plurality of access networks. Each client access resiliency policy may identify, at least in part, which clients of the plurality of clients are permitted to communicate packets for one or more traffic service classes of the plurality of service classes for each access network of the plurality of access networks. In some instances a client access resiliency policy may be expressed as a client group access resiliency policy (e.g., for all client devices mapped to a particular connectivity zone).

At 510, the method may include the intent policy system communicating each network access resiliency policy to each client of the plurality of clients and communicating each client access resiliency policy to each access network of the plurality of access networks.

In some embodiments, the method may further include calculating an actual resiliency for at least one access network of the plurality of access networks based, at least in part, on assurance measures obtained from the at least one access network and/or obtained from one or more clients. In such instances, the method may further include updating at least one zone policy for at least one traffic service class based on the actual resiliency calculated for the at least one access network to generate an updated zone policy for at least one traffic service class; updating, based on the updated zone policy, at least one of: at least one network access resiliency policy to generate an updated network access resiliency policy for at least one client; and at least one client access resiliency policy to generate an updated client access resiliency policy for at least one access network; and communicating at least one of: the updated network access resiliency policy to the at least one client; and the updated client access resiliency policy to the at least one access network. In some embodiments, intended and/or actual resiliencies may be calculated as a combination of resiliencies for each of two or more access networks.

Figure 6:
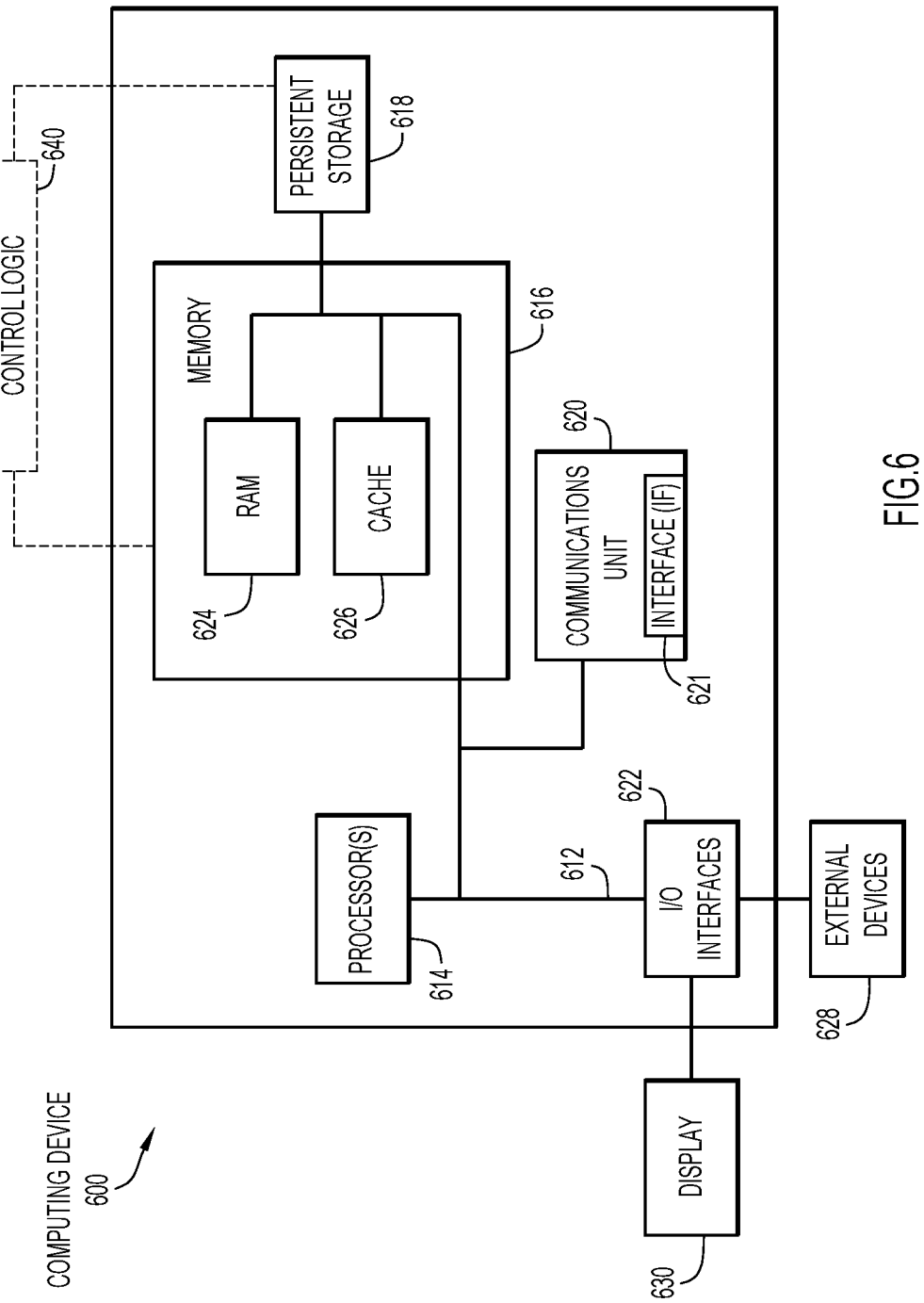
FIG. 6 is a hardware block diagram of a computing device that may perform functions associated with any combination of operations described herein in connection with techniques depicted in FIGS. 1-5.

Referring to FIG. 6, FIG. 6 illustrates a hardware block diagram of a computing device 600 that may perform functions associated with operations discussed herein in connection with the techniques depicted in FIGS. 1-5. In various embodiments, a computing device, such as computing device 600 or any combination of computing devices 600, may be configured an elements/devices/nodes as discussed for the techniques depicted in connection with FIGS. 1-5.

In one embodiment, computing device 600 may be configured as an intent policy system, such as intent policy system 102. In still some embodiments, computing device 700 or any combination of computing devices may be configured as any of client devices 130, access network elements for one or more access networks (e.g., any controllers, managers, radio nodes, etc. for any of WWA AN 120, WWA AN 122, WLA AN 124, and/or cabled AN 126), and/or another other element/entity as discussed for embodiments herein.

It should be appreciated that FIG. 6 provides only an illustration of one embodiment and does not imply any limitations with regard to the environments in which different embodiments may be implemented. Many modifications to the depicted environment may be made.

As depicted, the computing device 600 includes a bus 612, which provides communications between computer processor(s) 614, memory 616, persistent storage 618, at least one communications unit 620, and input/output (I/O) interface(s) 622. Bus 612 can be implemented with any architecture designed for passing data and/or control information between processors (which may be inclusive of hardware processors, such as microprocessors, communications and network processors, etc.), system memory, peripheral devices, and any other hardware components within a system. For example, bus 612 can be implemented with one or more buses.

Memory 616 and persistent storage 618 are computer readable storage media, which can be inclusive on non-transitory computer readable storage media. In the depicted embodiment, memory 616, which may be inclusive of one or more memory element(s), includes random access memory (RAM) 624 and cache memory 626. In general, memory 616 can include any suitable volatile or non-volatile computer readable storage media. Instructions for control logic 640 may be stored in memory 616 and/or persistent storage 618 for execution by processor(s) 614. Control logic 640 may include and/or be configured with any combination of functionality, client devices, controllers, logic, etc. discussed for various embodiments herein.

When the processor(s) 614 execute control logic 640, the processor(s) 614 are caused to perform the operations described above in connection with FIGS. 1-5.

For example, when computing device 600 is configured as intent policy system 102, control logic 640 may be configured as assurance management logic 104, resiliency calculation logic 106, and policy management logic 108 as discussed herein such that when processor(s) 614 execute control logic 640, the processor(s) 614 may be caused to perform operations such as calculating an intended resiliency for each of a plurality of access networks based on resiliency characteristics obtained from each of the plurality of access networks and determining, based, at least in part, on the intended resiliency for each of the plurality of access networks, zone policies for each of a plurality of connectivity zones of a geographical area and for each of a plurality of traffic service classes, wherein each connectivity zone of the plurality of connectivity zones provides access network connectivity for one or more access networks of the plurality of access networks; determining, based on the zone policies, a network access resiliency policy for each client of a plurality of clients within each of the plurality of connectivity zones, wherein each network access resiliency policy for each client identifies one or more access networks to which each client is allowed to send packets for one or more traffic service classes of the plurality of traffic service classes; determining, based on the zone policies, a client access resiliency policy for each access network of the plurality of access networks, wherein each client access resiliency policy identifies, at least in part, which clients of the plurality of clients are permitted to communicate packets for one or more traffic service classes of the plurality of service classes for each access network of the plurality of access networks; and communicating each network access resiliency policy to each client of the plurality of clients and communicating each client access resiliency policy to each access network of the plurality of access networks.

In another example, when computing device 600 is configured as a client device 130, control logic 640 may be configured as policy enforcement logic 132 and assurance reporting logic 134 as discussed herein such that when processor(s) 614 execute control logic 640, the processor(s) 614 perform operations as discussed herein for client device 130.

One or more programs and/or other logic may be stored in persistent storage 618 for execution by one or more of the respective computer processors 614 via one or more memory element(s) of memory 616. The persistent storage 618 may be a magnetic hard disk drive, a solid-state hard drive, a semiconductor storage device, read-only memory (ROM), erasable programmable read-only memory (EPROM), flash memory, or any other computer readable storage media that is capable of storing program instructions or digital information.

The media used by persistent storage 618 may also be removable. For example, a removable hard drive may be used for persistent storage 618. Other examples include optical and magnetic disks, thumb drives, and smart cards that are inserted into a drive for transfer onto another computer readable storage medium that is also part of persistent storage 618.

Communications unit 620, in these examples, provides for communications with other data processing systems, networks, and/or devices. In these examples, each communications unit 620 may include at least one interface (IF) 621, which may facilitate communications with systems, networks, and/or devices utilizing any combination of hardware, software, etc. to facilitate one or more connections for communications discussed herein. Accordingly, communications unit 620 may provide communications through the use of any combination of physical and/or wireless communications links.

I/O interface(s) 622 allows for input and output of data with other devices that may be connected to computing device 600. For example, I/O interface 622 may provide a connection to external devices 628 such as a keyboard, keypad, a touch screen, and/or some other suitable input device. External devices 628 can also include portable computer readable storage media such as database systems, thumb drives, portable optical or magnetic disks, and memory cards.

Software and data used to practice embodiments can be stored on such portable computer readable storage media and can be loaded onto persistent storage 618 via I/O interface(s) 622. I/O interface(s) 622 may also connect to a display 630. Display 630 provides a mechanism to display data to a user and may be, for example, a computer monitor and/or any other display device.

In summary, techniques herein may facilitate describing and/or defining network policies and defining sets of characteristics that can be measured to enable high-resiliency network deployments and assurance approaches. The net result is a set of techniques that may provide a system designer and operator of a high-resiliency networking environment with the ability to deploy wireless technologies alongside cabled approaches to satisfy various demands of high-resiliency networking.

In one form, a computer-implemented method is provided that may include calculating an intended resiliency for each of a plurality of access networks based on resiliency characteristics obtained from each of the plurality of access networks; determining, based, at least in part, on the intended resiliency for each of the plurality of access networks, zone policies for each of a plurality of connectivity zones of a geographical area and for each of a plurality of traffic service classes, wherein each connectivity zone of the plurality of connectivity zones provides access network connectivity for one or more access networks of the plurality of access networks; determining, based on the zone policies, a network access resiliency policy for each client of a plurality of clients within each of the plurality of connectivity zones, wherein each network access resiliency policy for each client identifies one or more access networks to which each client is allowed to send packets for one or more traffic service classes of the plurality of traffic service classes; determining, based on the zone policies, a client access resiliency policy for each access network of the plurality of access networks, wherein each client access resiliency policy identifies, at least in part, which clients of the plurality of clients are permitted to communicate packets for one or more traffic service classes of the plurality of traffic service classes for each access network of the plurality of access networks; and communicating each network access resiliency policy to each client of the plurality of clients and communicating each client access resiliency policy to each access network of the plurality of access networks.

Each zone policy may identify one or more of the plurality of access networks that can be utilized for transporting traffic flows within each connectivity zone for one or more traffic service classes of the plurality of traffic service classes in order to satisfy, at least in part, a threshold resiliency metric associated with the one or more service classes. In some instances, at least one zone policy for a particular connectivity zone may further determined based on a service cost associated with at least one access network of the plurality of access networks. In at least one instance, at least one client access resiliency policy for at least one client identifies whether multipath transport is to be provided for one or more traffic service classes of the plurality of traffic service classes for the at least one client.

In some instances, the method may further include calculating an actual resiliency for at least one access network of the plurality of access networks based, at least in part, on assurance measures obtained from the at least one access network. In some instances, the calculating may be further based on assurance measures for the at least one access network obtained from one or more clients.

In some instances, the method may further include updating at least one zone policy for at least one traffic service class based on the actual resiliency calculated for the at least one access network to generate an updated zone policy for at least one traffic service class; updating, based on the updated zone policy, at least one of: at least one network access resiliency policy to generate an updated network access resiliency policy for at least one client; and at least one client access resiliency policy to generate an updated client access resiliency policy for at least one access network; and communicating at least one of: the updated network access resiliency policy to the at least one client; and the updated client access resiliency policy to the at least one access network.

In some instances, threshold resiliency metrics for at least one traffic service class may be associated with one of: Ultra-Reliable and Low-Latency Communications (URLLC); and Time Sensitive Network (TSN) communications. In some instances, the plurality of clients are grouped by one or more of: a client type, a client group, and a client capability.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

As used herein, unless expressly stated to the contrary, use of the phrase 'at least one of', 'one or more of', 'and/or', variations thereof, or the like are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, node, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Communications in a network environment can be referred to herein as 'commands', 'messages', 'messaging', 'signaling', 'data', 'content', 'objects', 'requests', 'queries', 'responses', 'replies', etc. which may be inclusive of packets. Additionally, messages, requests, responses, replies, queries, etc. are forms of network traffic and, therefore, may comprise one or more packets. As referred to herein and in the claims, the term 'packet' may be used in a generic sense to include packets, frames, segments, datagrams, and/or other generic data units that may be used to transmit communications (e.g., data, commands, etc.) in a network environment. A packet is a formatted unit of data that can contain control or routing information (e.g., source and destination address, source and destination port, etc.) and data, which is also sometimes referred to as a payload or data payload. In some embodiments, control or routing information, management information, or the like can be included in packet fields, such as within header(s) and/or trailer(s) of packets. Internet Protocol (IP) addresses discussed herein and in the claims can include IP version 4 (IPv4) and/or IP version 6 (IPv6) addresses.

The terms 'data', 'information', 'parameters,' and the like as used herein can refer to any type of binary, numeric, voice, video, textual or script data or information or any type of source or object code, or any other suitable data or information in any appropriate format that can be communicated from one point to another via electronic devices and/or networks.

Data or information relating to operations described herein may be stored within any conventional or other data structures (e.g., files, arrays, lists, stacks, queues, records, etc.) and may be stored in any desired storage unit (e.g., database, data or other repositories, queue, etc.). The data or information transmitted between entities may include any desired format and arrangement, and may include any quantity of any types of fields of any size to store the data. The definition and data/information model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer systems or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), wireless LAN (WLAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium, non-transitory computer readable storage medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

A network may be implemented by any number of any type of network (e.g., LAN, WAN, WLAN, Internet, Intranet, Virtual Private Network (VPN), Ethernet network, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

A system or computing device may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. A database system may be included within or coupled to a server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium, which can be inclusive of non-transitory computer readable storage medium, can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet using an Internet Service Provider). In some embodiments, electronic circuitry including, for example, a hardware processor, logic, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flow chart illustrations and/or block diagrams of methods, apparatus (systems), and computer program products according to the embodiments. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow chart and/or block diagram block or blocks.

The flow chart(s) and block diagram(s) in the figures illustrate the architecture, functionality, and operation of possible implementations of systems, methods, and computer program products according to various embodiments. In this regard, each block in the flowchart or block diagrams may represent a module, logic, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flow chart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method performed by a computing device, comprising:

calculating an intended resiliency for each of a plurality of access networks based on resiliency characteristics obtained from each of the plurality of access networks;

determining, based, at least in part, on the intended resiliency for each of the plurality of access networks, zone policies for each of a plurality of connectivity zones of a geographical area and for each of a plurality of traffic service classes, wherein each connectivity zone of the plurality of connectivity zones provides access network connectivity for one or more access networks of the plurality of access networks;

determining, based on the zone policies, a network access resiliency policy for each client of a plurality of clients within each of the plurality of connectivity zones, wherein each network access resiliency policy for each client identifies one or more access networks of the plurality of access networks to which each client is allowed to send packets for one or more traffic service classes of the plurality of traffic service classes;

determining, based on the zone policies, a client access resiliency policy for each access network of the plurality of access networks, wherein each client access resiliency policy identifies, at least in part, which clients of the plurality of clients are permitted to communicate packets for one or more traffic service classes of the plurality of traffic service classes for each access network of the plurality of access networks; and communicating each network access resiliency policy to each client of the plurality of clients and communicating each client access resiliency policy to each access network of the plurality of access networks.

2. The method of claim 1, wherein each zone policy identifies one or more of the plurality of access networks that can be utilized for transporting traffic flows within each connectivity zone for one or more traffic service classes of the plurality of traffic service classes in order to satisfy, at least in part, a threshold resiliency metric associated with the one or more service classes.

3. The method of claim 1, wherein at least one zone policy for a particular connectivity zone is further determined based on a service cost associated with at least one access network of the plurality of access networks.

4. The method of claim 1, wherein at least one client access resiliency policy for at least one client identifies whether multipath transport is to be provided for one or more traffic service classes of the plurality of traffic service classes for the at least one client.

5. The method of claim 1, further comprising:
calculating an actual resiliency for at least one access network of the plurality of access networks based, at least in part, on assurance measures obtained from the at least one access network.

6. The method of claim 5, wherein the calculating is further based on assurance measures for the at least one access network obtained from one or more clients.

7. The method of claim 5, further comprising:
updating at least one zone policy for at least one traffic service class based on the actual resiliency calculated for the at least one access network to generate an updated zone policy for at least one traffic service class;
updating, based on the updated zone policy, at least one of:
at least one network access resiliency policy to generate an updated network access resiliency policy for at least one client; or
at least one client access resiliency policy to generate an updated client access resiliency policy for at least one access network; and
communicating at least one of:
the updated network access resiliency policy to the at least one client; or the updated client access resiliency policy to the at least one access network.

8. The method of claim 1, wherein threshold resiliency metrics for at least one traffic service class are associated with one of:
Ultra-Reliable and Low-Latency Communications (URLLC); or
Time Sensitive Network (TSN) communications.

9. The method of claim 1, wherein the plurality of clients are grouped by one or more of: a client type, a client group, or a client capability.

10. One or more non-transitory computer readable storage media encoded with instructions that, when executed by a processor, cause the processor to perform operations, comprising:
calculating an intended resiliency for each of a plurality of access networks based on resiliency characteristics obtained from each of the plurality of access networks;
determining, based, at least in part, on the intended resiliency for each of the plurality of access networks, zone policies for each of a plurality of connectivity zones of a geographical area and for each of a plurality of traffic service classes, wherein each connectivity zone of the plurality of connectivity zones provides access network connectivity for one or more access networks of the plurality of access networks;
determining, based on the zone policies, a network access resiliency policy for each client of a plurality of clients within each of the plurality of connectivity zones, wherein each network access resiliency policy for each client identifies one or more access networks of the plurality of access networks to which each client is allowed to send packets for one or more traffic service classes of the plurality of traffic service classes;
determining, based on the zone policies, a client access resiliency policy for each access network of the plurality of access networks, wherein each client access resiliency policy identifies, at least in part, which clients of the plurality of clients are permitted to communicate packets for one or more traffic service classes of the plurality of traffic service classes for each access network of the plurality of access networks; and
communicating each network access resiliency policy to each client of the plurality of clients and communicating each client access resiliency policy to each access network of the plurality of access networks.

11. The media of claim 10, wherein each zone policy identifies one or more of the plurality of access networks that can be utilized for transporting traffic flows within each connectivity zone for one or more traffic service classes of the plurality of traffic service classes in order to satisfy, at least in part, a threshold resiliency metric associated with the one or more service classes.

12. The media of claim 10, wherein at least one zone policy for a particular connectivity zone is further determined based on a service cost associated with at least one access network of the plurality of access networks.

13. The media of claim 10, the operations further comprising:
calculating an actual resiliency for at least one access network of the plurality of access networks based, at least in part, on assurance measures obtained from the at least one access network.

14. The media of claim 13, wherein the calculating is further based on assurance measures for the at least one access network obtained from one or more clients.

15. The media of claim 13, the operations further comprising:
updating at least one zone policy for at least one traffic service class based on the actual resiliency calculated for the at least one access network to generate an updated zone policy for at least one traffic service class;
updating, based on the updated zone policy, at least one of:
at least one network access resiliency policy to generate an updated network access resiliency policy for at least one client; or
at least one client access resiliency policy to generate an updated client access resiliency policy for at least one access network; and
communicating at least one of:
the updated network access resiliency policy to the at least one client; or
the updated client access resiliency policy to the at least one access network.

16. An apparatus comprising:
at least one memory element for storing data; and
at least one processor for executing instructions associated with the data, wherein executing the instructions causes the apparatus to perform operations, comprising:
calculating an intended resiliency for each of a plurality of access networks based on resiliency characteristics obtained from each of the plurality of access networks;
determining, based, at least in part, on the intended resiliency for each of the plurality of access networks, zone policies for each of a plurality of connectivity zones of a geographical area and for each of a plurality of traffic service classes, wherein each connectivity zone of the plurality of connectivity zones provides access network connectivity for one or more access networks of the plurality of access networks;
determining, based on the zone policies, a network access resiliency policy for each client of a plurality of clients within each of the plurality of connectivity zones, wherein each network access resiliency policy for each client identifies one or more access networks of the plurality of access networks to which each client is allowed to send packets for one or more traffic service classes of the plurality of traffic service classes;

determining, based on the zone policies, a client access resiliency policy for each access network of the plurality of access networks, wherein each client access resiliency policy identifies, at least in part, which clients of the plurality of clients are permitted to communicate packets for one or more traffic service classes of the plurality of traffic service classes for each access network of the plurality of access networks; and communicating each network access resiliency policy to each client of the plurality of clients and communicating each client access resiliency policy to each access network of the plurality of access networks.

17. The apparatus of claim 16, wherein each zone policy identifies one or more of the plurality of access networks that can be utilized for transporting traffic flows within each connectivity zone for one or more traffic service classes of the plurality of traffic service classes in order to satisfy, at least in part, a threshold resiliency metric associated with the one or more service classes.

18. The apparatus of claim 16, wherein executing the instructions causes the apparatus to perform further operations, comprising:

calculating an actual resiliency for at least one access network of the plurality of access networks based, at least in part, on assurance measures obtained from the at least one access network.

19. The apparatus of claim 18, wherein the calculating is further based on assurance measures for the at least one access network obtained from one or more clients.

20. The apparatus of claim 18, wherein executing the instructions causes the apparatus to perform operations, comprising:

updating at least one zone policy for at least one traffic service class based on the actual resiliency calculated for the at least one access network to generate an updated zone policy for at least one traffic service class;

updating, based on the updated zone policy, at least one of:
at least one network access resiliency policy to generate an updated network access resiliency policy for at least one client; or
at least one client access resiliency policy to generate an updated client access resiliency policy for at least one access network; and communicating at least one of:
the updated network access resiliency policy to the at least one client; or the updated client access resiliency policy to the at least one access network.

\* \* \* \* \*